April 8, 1958   J. MERCIER   2,829,401
ART OF MOLDING BLADDERS
Filed Feb. 23, 1956   2 Sheets-Sheet 1
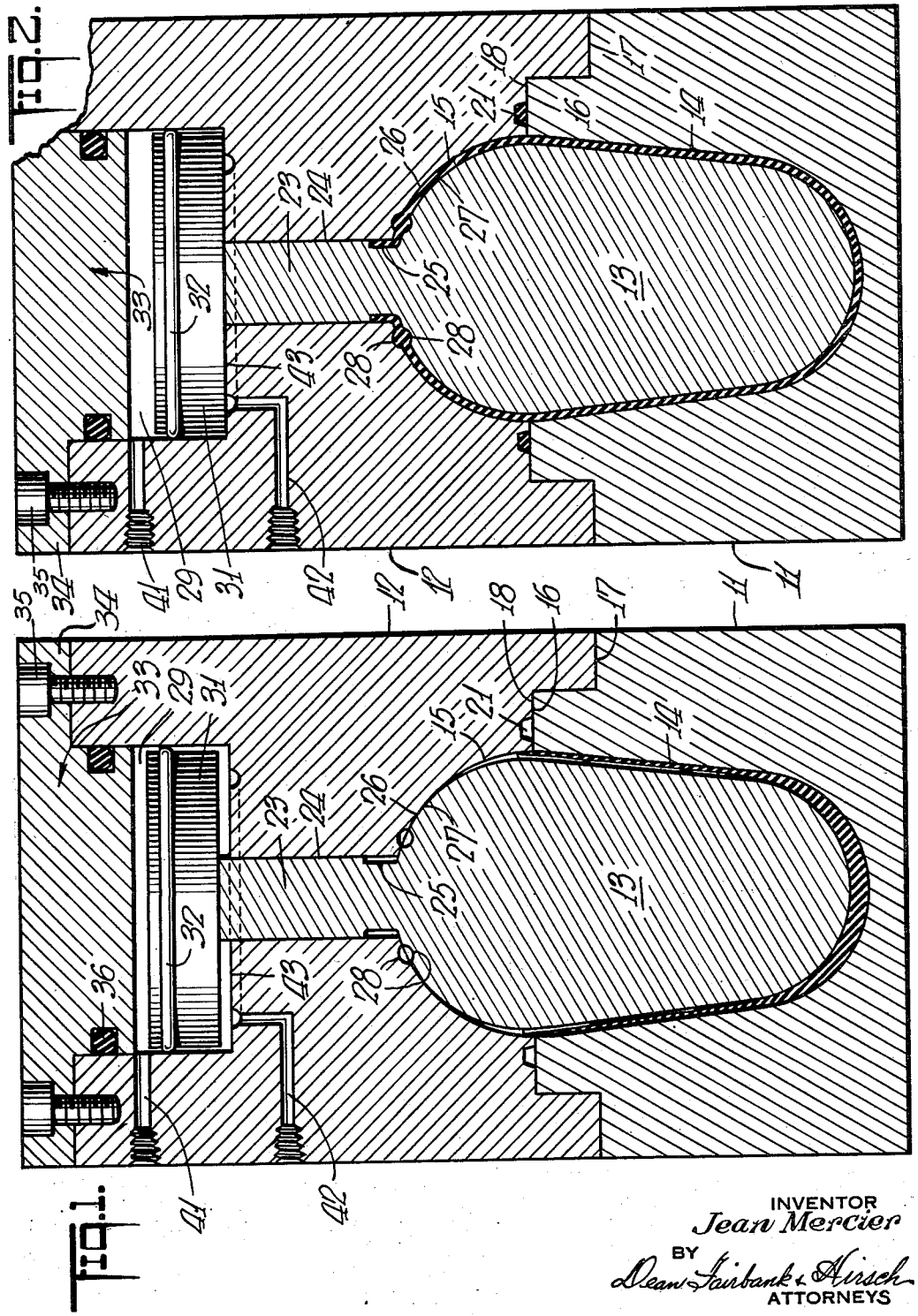
INVENTOR
Jean Mercier
BY
Dean Fairbank & Hirsch
ATTORNEYS April 8, 1958 J. MERCIER 2,829,401
ART OF MOLDING BLADDERS
Filed Feb. 23, 1956 2 Sheets-Sheet 2
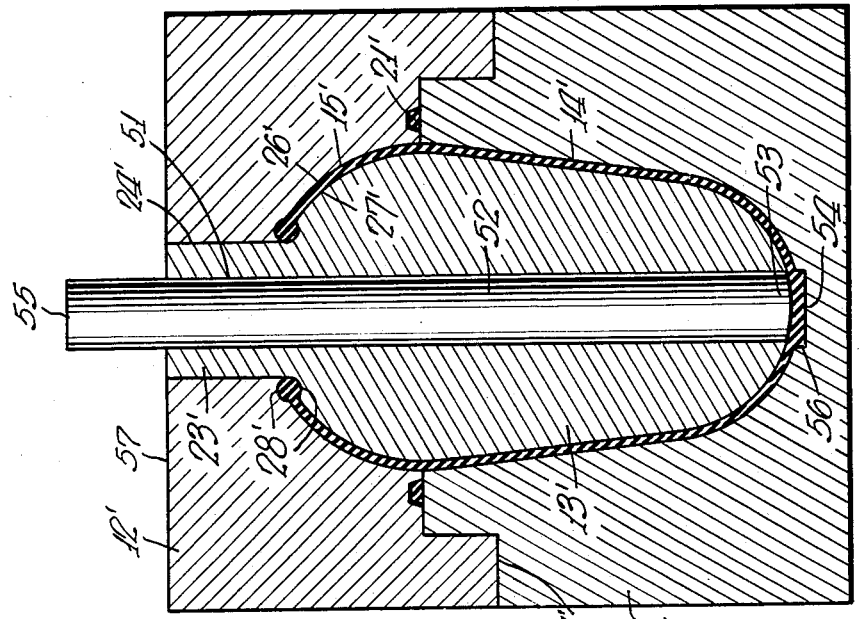
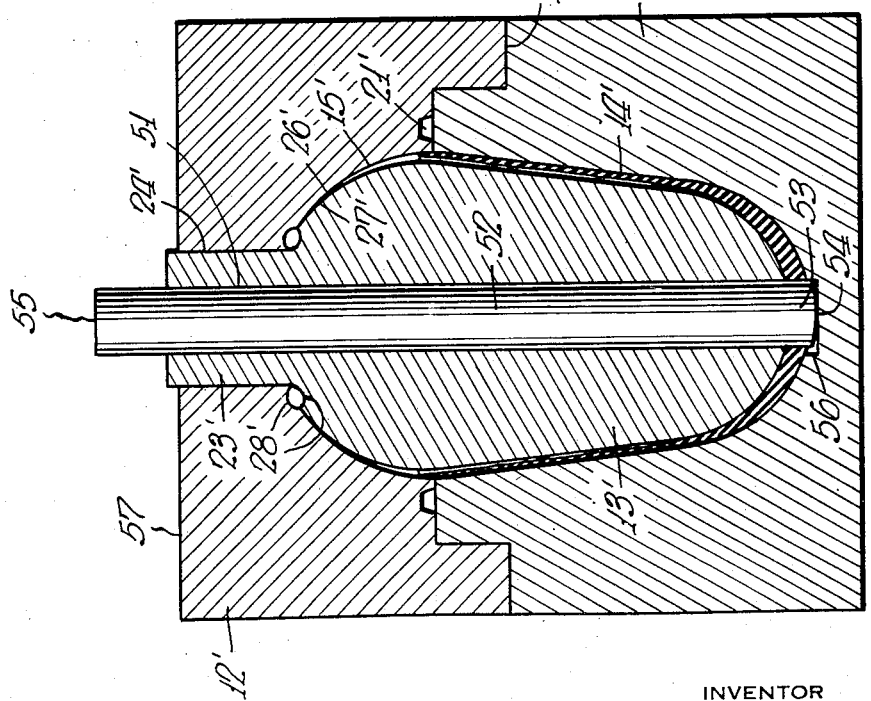
INVENTOR
Jean Mercier
BY
Dean Fairbank & Hirsch
ATTORNEYS United States Patent Office 2,829,401
Patented Apr. 8, 1958

2,829,401

ART OF MOLDING BLADDERS

Jean Mercier, New York, N. Y.

Application February 23, 1956, Serial No. 567,329

11 Claims. (Cl. 18—42)

This invention relates to the art of molding and more particularly to the molding of elongated bladders for use in pressure accumulators.

As conducive to an understanding of the invention it is noted that when an elongated bladder is formed in a mold by pressure applied to a charge of material therein, where the elongated core is guided through its entire movement in the mold solely by an axial stem slidably mounted in a suitable bore in the mold cover, due to the pressure on the rubber and the play between the stem and the bore, the core is likely to be moved off center with consequent lack of uniformity in the cross sectional thickness of the bladder wall with resultant possibility of rupture of the thinner wall portion of the bladder.

Where to avoid such off-centering of the core, it is fixed in position and the bladder material is injected laterally into the mold from several places, due to the relative thinness of the bladder wall, the resultant bladder may have weak portions at the junctions between the several charges of material injected into the mold. Furthermore, due to the high pressures required for the injection of the charges of material, the resultant heat developed may cause uneven vulcanization of the bladder.

It is accordingly among the objects of the invention to provide a mold that has but few simple parts which may readily be fabricated and which are simple to operate, to form, by compression molding without the need for injection of material thereinto an elongated one piece bladder devoid of junctions or openings except for its mouth, with assurance that the cross sectional wall thickness of the bladder will be uniform.

According to the invention, these objects are accomplished by the arrangement and combination of elements hereinafter described and particularly recited in the claims.

In the accompanying drawings in which are shown one or more of various possible embodiments of the several features of the invention:

Fig. 1 is a longitudinal sectional view of one embodiment of the mold in partially closed condition, Fig. 2 is a view similar to Fig. 1 of the mold in completely closed condition, Fig. 3 is a view similar to Fig. 1 of another embodiment of the mold, and Fig. 4 is a view similar to Fig. 2 of the mold of Fig. 3.

Referring now to the drawings, the mold shown in Figs. 1 and 2 comprises a base member 11, a cover member 12 and a core 13. The base and the cover member each has a recess 14 and 15 therein which, when juxtaposed, define a cavity that conforms to the desired substantially conical configuration of the bladder.

As is clearly shown in Figs. 1 and 2, the base 11 is of reduced diameter near its top surface 16 defining an annular shoulder 17 and the cover has a complementary depression 18 in its undersurface of diameter slightly greater than that of the reduced diameter portion of base 11 so that the cover may be accurately positioned on the base with substantially no transverse play. Desirably the portion of the cover 12 adjacent the recess 15 therein has an annular groove 21 to collect excess material extruded during the molding operation.

The core 13 which also conforms to the configuration of the bladder, has an axial stem 23 which is of diameter slightly less than that of a bore 24 in the cover member 12 so that it may readily slide therein and the root end of the stem 23 is of reduced diameter as at 25.

The portions 26, 27 of the recess 15 and core 13 adjacent the bore 24 and stem 23 respectively are of complementary curvature so that they may fit snugly against each other for the purpose hereinafter set forth and annular grooves 28 are provided in such portions 26, 27 adjacent the root end of stem 23 to form the beaded rim of the bladder.

The cover member 12 desirably has a central recess 29 therein in communication with the outer end of bore 24 and the stem 23 is of length such that when the mold is closed, prior to application of pressure against the stem 23, the free end of the latter will extend into such recess.

Slidably mounted in the recess 29 is a piston 31 which desirably has an encompassing seal ring 32 to provide a seal between the piston and the side wall of recess 29. A cap 33 positioned in the top of said recess to close the latter so that it defines the piston chamber, has an annular flange 34 which may be secured to the top of the cover as by screws 35. Desirably, the cap has an encompassing seal ring 36 which engages the side wall of the recess 29 to provide a seal between the cap and such side wall.

Means are provided to apply pressure against the piston 31. To this end, the cover 12 has a pair of passageways 41, 42, the former leading into the recess 29 between the piston 31 and cap 33 and the latter into the recess 29 between piston 31 and the floor 43 of the recess.

To form a bladder from the mold shown in Figs. 1 and 2, a predetermined charge of material from which the bladder is formed is placed in the bottom of recess 14. The core 13 is then placed in the recess 14 and the cover member 12 positioned on the base 11 with the stem 23 of the core 13 located in the bore 24.

Thereupon, the cover member 12 is forced downwardly against the base 11 as by means of a suitable hydraulic press, until the periphery of cover 12 is seated against shoulder 17 of the base and the cover is retained in this position during the molding operation.

As a result of such downward movement of the cover 12, due to the charge of material in recess 14, the core 13 will move upwardly until the surfaces 26 and 27 of the recess and core are in engagement. With such upward movement the stem 23 will protrude into the recess 29 forcing the piston 31, which is unrestrained, upwardly.

Thereupon oil under pressure may be applied to passageway 41 forcing the piston 31 downwardly until it seats against the floor 43 of recess 29, at the same time moving the stem 23 and core 13 downwardly.

Inasmuch as there will be relatively little downward displacement of the core 13 to its final position, as the latter was originally accurately centered by reason of the complementary conformations 26, 27, the stem 23 will be guided by the bore 24 in the relatively short final movement of the core, so that the latter in its lowermost position will remain accurately centered in the recesses 14, 15.

With such final downward movement of core 13, the charge of material will rise in the space between the core and the walls of recesses 14, 15 to fill such space as well as the annular grooves 28, thus forming the bladder. Excess material will flow into the annular groove 21 as well as in the space defined by the reduced diameter portion 25 of stem 23, and after the bladder is finally formed, such excess material may be cut off.

When fluid under pressure is forced through passageway 41, the passageways 42 will be left open to a reservoir, for example, so that oil and air beneath the piston may be discharged.

After the bladder is molded, the pressure applied to passageway 41 is released and the cover portion 12 raised from the base of the mold. The core is then removed and the bladder stripped therefrom in any suitable manner.

The embodiment of the mold shown in Figs. 3 and 4, which is for the manufacture of relatively long bladders, is similar in many respects to the mold shown in Figs. 1 and 2 and corresponding elements have the same reference numerals primed.

The core 13' and stem 23' have an axial bore 51 therethrough in which a rod 52 is slidably mounted. The rod 52 is of length greater than that of the core 13' and stem 23', and the lower end 53 of the rod is adapted to be seated in a corresponding axial depression 54 in the recess 14'. The depression 54 desirably has a slot 56 at the side thereof to permit passage of the material being molded.

The stem 23' of the core 13', when the mold is closed, extends slightly beyond the top suface 57 of the cover portion 12' by an amount substantially equal to the distance of travel of the core 13' during the final molding operation and the upper end 55 of rod 52 extends beyond the stem 23'.

To form a bladder from the mold shown in Figs. 3 and 4, the rod 52 is first positioned in the depression 54 in recess 14' of base 11'. A predetermined charge of material from which the bladder is formed is placed in the bottom of recess 14' around the rod 52. The core 13' is then positioned in the recess 14' with the rod 52 extending through the bore 51. The cover member 12' is then positioned over the base 11' with the stem 23' extending through the bore 24' of the cover member.

Thereupon the cover member 12' is forced downwardly against the base 11' as by a suitable hydraulic press until the periphery of cover 12' is seated against shoulder 17' of the base, and the cover 12' is retained in this position during the molding operation. The rod 52 is restrained from movement during the downward movement of the cover 12' to prevent displacement of such rod due to passage of material through slot 56 into the depression 54.

As a result of such downward movement of the head 12', due to the charge of material in recess 14', the core 13' which is unrestrained, will move upwardly until the surfaces 26', 27' of the recess 15' and core 13' are in engagement as shown in Fig. 3. With such upward movement, the stem 23' will protrude beyond the top surface of cover 12'.

Thereupon pressure is applied to the protruding end of stem 23' forcing the latter downward to move the core 13' into the mold.

Inasmuch as there will be relatively little downward displacement of the core 13' to its final position, as the latter was originally accurately centered by reason of the complementary conformations 26', 27' as well as the rod 52, the core will be guided by such rod 52 as well as by the bore 24' in head 12', in the relatively short final movement of the core, so that the latter in its lowermost position will remain accurately centered in the recesses 14', 15'.

With such final downward movement of core 13' some of the material in recess 14' will be forced through slot 56 beneath the end 53 of rod 52 to lift such rod and such movement is permitted until the end of the rod is flush with the end of core 13'. Thus, the bottom of the bladder will be imperforate. The charge of material will rise in the space between the core 13' and the walls of recesses 14' and 15' to fill such space as well as the annular groove 28' thus forming the bladder. Excess material will flow into the annular groove 21' and after the bladder is formed such excess material may be cut off.

After the bladder is formed, the mold may be opened and the core removed. With the rod 52 withdrawn from the core, the bladder may be stripped therefrom by applying air under pressure to the bore 51.

With the molds above described, an elongated bladder may readily be formed with assurance that the cross sectional wall thickness will be uniform.

As many changes could be made in the above constructions, and many apparaently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A mold for forming elongated bladders, comprising a base member and a cover member having a bore, each of said members having a recess therein, said recesses when juxtaposed defining a cavity conforming to the shape of the bladder to be formed, a core comprising a body portion of configuration conforming to the shape of the bladder and of length slightly less than the length of said cavity, said core having an axial stem slidably mounted in the bore in said cover member, said stem having a diameter substantially smaller than the maximum diameter of said core, the curvatures of a portion of the recess in said cover member adjacent the bore in the latter and a portion of the core adjacent the root end of the stem thereof being complementary, and adapted snugly to engage each other over a relatively large region to center said core in said recesses.

2. The combination set forth in claim 1 in which said cover member has an additional recess in communication with said bore, and a cap positioned in said additional recess is affixed to the top of said cover member to define a chamber, a piston is slidably mounted in said chamber and adapted to react against the end of said stem to move said core into said mold cavity, and means are provided to apply pressure against said piston.

3. The combination set forth in claim 2 in which a seal ring encompasses said piston to provide a seal with respect to the side wall of said chamber.

4. The combination set forth in claim 1 in which said cover member has a chamber in communication with said bore, a piston is slidably mounted in said chamber adapted to react against the end of said stem to move said core into said mold cavity, and means are provided to apply pressure against said piston.

5. The combination set forth in claim 4 in which said means comprises a passageway in said cover member leading into said chamber above said piston.

6. The combination set forth in claim 4 in which said means comprises a pair of passageways in said cover member leading into said chamber above and below said piston respectively.

7. The combination set forth in claim 1 in which said base member is of reduced dimensions adjacent its upper surface defining a shoulder and said cover member has a recess in its undersurface complementary to the reduced portion of said base member so that said reduced portion may readily fit in said recess with the periphery of said cover member resting on said shoulder when said mold is closed.

8. The combination set forth in claim 7 in which adjacent surfaces of said cover member and said base member are conformed to define a groove adjacent the recesses therein defining said cavity.

9. The combination set forth in claim 1 in which said core and said stem have an axial bore therethrough, a rod is slidably mounted in said bore and is of length greater than that of said stem and said core, and said recess in said base member has a depression to accommodate the lower end of said rod.

10. The combination set forth in claim 9 in which means are provided to afford communication from the space between said core and the wall of the recess in said base member, into said depression.

11. The combination set forth in claim 1 in which said stem is adapted to protrude beyond the top surface of said cover member when the mold is partially closed.

References Cited in the file of this patent

UNITED STATES PATENTS

| | | |
|---|---|---|
| 1,498,335 | Von Hambach | June 17, 1924 |
| 2,377,892 | Lippincott | June 12, 1945 |